United States Patent

Chatterji et al.

[11] Patent Number: 6,006,836
[45] Date of Patent: Dec. 28, 1999

[54] METHODS OF SEALING PLUGS IN WELL BORES

[75] Inventors: Jiten Chatterji; David D. Onan; Patty L. Onan, all of Duncan; Roger S. Cromwell, Walters; Bobby J. King, Duncan, all of Okla.

[73] Assignee: Halliburton Energy Services, Inc., Duncan, Okla.

[21] Appl. No.: 09/087,405

[22] Filed: May 29, 1998

Related U.S. Application Data

[63] Continuation-in-part of application No. 09/059,273, Apr. 13, 1998, Pat. No. 5,875,845, which is a continuation-in-part of application No. 08/914,594, Aug. 18, 1997, Pat. No. 5,873,413.

[51] Int. Cl.$^6$ ..................................................... E21B 33/13
[52] U.S. Cl. ............................................ 166/295; 166/387
[58] Field of Search ................................. 166/293–295, 166/300, 387

[56] References Cited

U.S. PATENT DOCUMENTS

| | | | |
|---|---|---|---|
| 2,815,079 | 12/1957 | Goins, Jr. et al. | 166/29 |
| 3,082,823 | 3/1963 | Hower | 166/29 |
| 3,208,525 | 9/1965 | Caldwell et al. | 166/33 |
| 3,310,111 | 3/1967 | Pavlich et al. | 166/33 |
| 3,416,604 | 12/1968 | Rensvold | 166/33 |
| 3,467,208 | 9/1969 | Kelly | 175/72 |
| 3,750,768 | 8/1973 | Suman, Jr. et al. | 175/72 |
| 3,782,466 | 1/1974 | Lawson et al. | 166/254 |
| 3,933,204 | 1/1976 | Knapp | 166/292 |
| 3,960,801 | 6/1976 | Cole et al. | 260/33.6 EP |
| 3,976,135 | 8/1976 | Anderson | 166/276 |
| 4,042,031 | 8/1977 | Knapp | 166/276 |
| 4,042,032 | 8/1977 | Anderson et al. | 166/276 |
| 4,072,194 | 2/1978 | Cole et al. | 166/295 |
| 4,101,474 | 7/1978 | Copeland et al. | 260/13 |
| 4,113,015 | 9/1978 | Meijs | 166/295 |
| 4,215,001 | 7/1980 | Elphingstone et al. | 252/8.55 C |
| 4,220,566 | 9/1980 | Constien et al. | 260/13 |
| 4,272,384 | 6/1981 | Martin | 252/8.55 R |
| 4,336,842 | 6/1982 | Graham et al. | 166/276 |
| 4,339,000 | 7/1982 | Cronmiller | 166/295 |
| 4,483,888 | 11/1984 | Wu | 427/336 |
| 4,489,785 | 12/1984 | Cole | 166/295 |
| 4,665,988 | 5/1987 | Murphey et al. | 166/295 |
| 4,741,401 | 5/1988 | Walles et al. | 166/300 |
| 4,785,884 | 11/1988 | Armbruster | 166/280 |
| 4,921,047 | 5/1990 | Summers et al. | 166/276 |
| 4,972,906 | 11/1990 | McDaniel | 166/276 |
| 5,090,478 | 2/1992 | Summers | 166/278 |
| 5,133,409 | 7/1992 | Bour et al. | 166/293 |
| 5,159,980 | 11/1992 | Onan et al. | 166/294 |
| 5,168,928 | 12/1992 | Terry et al. | 166/292 |
| 5,213,161 | 5/1993 | King et al. | 166/293 |
| 5,293,938 | 3/1994 | Onan et al. | 166/293 |
| 5,314,023 | 5/1994 | Dartez et al. | 166/295 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,428,178 | 6/1995 | Zuzich et al. | 549/378 |
| 5,458,195 | 10/1995 | Totten et al. | 166/293 |
| 5,547,027 | 8/1996 | Chan et al. | 166/295 |
| 5,559,086 | 9/1996 | Dewprashad | 507/219 |
| 5,873,413 | 2/1999 | Chatterji et al. | 166/293 |
| 5,875,844 | 3/1999 | Chatterji et al. | 166/293 |
| 5,875,845 | 3/1999 | Chatterji et al. | 166/293 |
| 5,875,846 | 3/1999 | Chatterji et al. | 166/293 |
| 5,911,282 | 6/1999 | Onan et al. | 175/75 |

FOREIGN PATENT DOCUMENTS

| | | | |
|---|---|---|---|
| EP 0 553 566 | 8/1993 | European Pat. Off. | C21B 43/04 |
| EP 0 802 253 | 10/1997 | European Pat. Off. | C09K 7/02 |
| 1315462 | 12/1962 | France. | |
| 1019122 | 2/1966 | United Kingdom | E02D 3/14 |
| WO 91/02703 | 7/1991 | WIPO. | |
| WO 94/12445 | 9/1994 | WIPO. | |

*Primary Examiner*—Roger Schoeppel
*Attorney, Agent, or Firm*—Craig W. Roddy; C. Clark Dougherty, Jr.

[57] ABSTRACT

The present invention provides improved methods of sealing a bridge plug or the like in a pipe disposed in a well bore. The methods basically include the steps of preparing a hardenable epoxy sealing composition which hardens into a resilient solid mass having a high pipe surface bond strength, placing the epoxy composition into the pipe adjacent to the bridge plug therein and allowing the epoxy composition to harden.

20 Claims, No Drawings

10

METHODS OF SEALING PLUGS IN WELL BORES

RELATED U.S. APPLICATION DATA

This application is a continuation-in-part of application Ser. No. 09/059,273 filed Apr. 13, 1998, now U.S. Pat. No. 5,875,845 which is a continuation-in-part of application Ser. No. 08/914,594 filed on Aug. 18, 1997 now U.S. Pat. No. 5,873,413.

BACKGROUND OF THE INVENTION

1. Field of the Invention

The present invention relates generally to improved methods of sealing bridge plugs in pipes disposed in well bores, and more particularly, to such methods wherein the sealant is highly resilient and has high bond strength.

2. Description of the Prior Art

Mechanical bridge plugs are commonly utilized to provide isolation of a subterranean zone penetrated by a well bore having a pipe string such as casing or a liner disposed therein. For example, in perforating casing in the zone and/or in stimulation treatments performed therein after perforations have been formed, a bridge plug is set in the casing above the zone. Because bridge plugs are mechanical and rigid after being set, when a pressure differential is exerted across the plug and the casing expands as a result of the pressure, the seal between the plug and the pipe is often lost which allows the plug to be moved within the pipe by the pressure differential.

Heretofore, in attempts to prevent the loss of seal and movement of a bridge plug, a quantity of a conventional Portland cement slurry has been placed in the pipe adjacent to the bridge plug and allowed to harden. However, when the pressure differential exerted on the bridge plug and the set cement column adjacent thereto reaches a sufficient level, the ability of the cement to maintain a bond to the pipe is overcome and the entire column comprised of bridge plug and set cement is moved in the pipe. This allows fluid to flow around the plug and cement which makes the drill-out of the plug and cement extremely difficult.

Thus, there is a need for improved methods of sealing a bridge plug in a pipe whereby the sealant used hardens into a highly resilient non-permeable mass which has a high pipe surface bond strength and can withstand pipe movements and high pressure differentials without failure.

SUMMARY OF THE INVENTION

The present invention provides improved methods of sealing a bridge plug or the like in a pipe disposed in a well bore using epoxy sealing compositions. The methods basically comprise the steps of preparing a hardenable epoxy sealing composition which hardens into a solid mass having high resiliency and a high pipe surface bond strength, placing the epoxy composition into the pipe adjacent to the bridge plug therein and allowing the epoxy composition to harden.

The epoxy compositions which are useful in accordance with this invention having high resiliencies and high bond strengths after hardening are comprised of an epoxy resin or an epoxide containing liquid, or both, an organosilane compound and at least one hardening agent. The epoxy compositions can also include a filler such as crystalline silica or the like.

It is, therefore, a general object of the present invention to provide improved methods of sealing bridge plugs and the like in pipes disposed in well bores.

Other and further objects, features and advantages of the present invention will be apparent to those skilled in the art upon a reading of the description of preferred embodiments which follows.

DESCRIPTION OF PREFERRED EMBODIMENTS

The present invention provides improved methods of sealing a bridge plug or the like in a pipe disposed in a well bore using a sealing composition which hardens after being placed in the pipe. In accordance with the methods, a sealing composition which hardens into a resilient solid mass having high pipe bond strength is prepared, placed in a pipe disposed in a well bore adjacent to a plug therein and allowed to harden. The sealing compositions which are useful in accordance with the present invention are epoxy compositions basically comprised of an epoxy resin or an epoxide containing liquid, or both, an organosilane compound and at least one hardening agent.

While various epoxy resins can be utilized, preferred such resins are those selected from the condensation products of epichlorohydrin and bisphenol A. A particularly suitable such resin is commercially available from the Shell Chemical Company under the trade designation "EPON®RESIN 828". This epoxy resin has a molecular weight of about 340 and a one gram equivalent of epoxide per about 180 to about 195 grams of resin. Another preferred epoxy resin is a condensation product of epichlorohydrin and bisphenol A which is predispersed in a non-ionic aqueous fluid and is commercially available from the Shell Chemical Company under the trade designation "EPI-REZ®-3510-W-60". This epoxy resin has a molecular weight of about 340 and a one gram equivalent of epoxide per 195 grams of resin. Another preferred epoxy resin is an epoxidized bisphenol A novalac resin which is predispersed in a non-ionic aqueous fluid and is commercially available from the Shell Chemical Company under the trade designation "EPI-REZ®-5003-W-55". This epoxy resin has a one gram equivalent of epoxide per about 205 grams of resin.

When used, the epoxy resin is generally included in an epoxy composition of this invention in an amount in the range of from about 10% to about 90% by weight of the epoxy composition, preferably in an amount of about 50%.

A solvent comprised of one or more aromatic hydrocarbons or a low viscosity epoxide containing liquid or a mixture of such epoxide containing liquids can be utilized to modify the viscosity of the epoxy resin used and to add flexibility and resiliency to the epoxy composition after hardening. An epichlorohydrin/bisphenol A condensation epoxy resin which has been modified with an aromatic solvent is commercially available from the Shell Chemical Company under the trade designation "EPSEAL RE®". A particularly suitable solvent which is presently preferred is comprised of a mixture of hydrocarbons containing from about 50% to about 99% of one or more aromatic hydrocarbons by weight of the solvent. Such a preferred solvent is commercially available under the tradename "CYCLO SOL 63™" from Shell Chemical Co. of Houston Tex.

When an aromatic solvent or an epoxide containing liquid or mixture of such liquids is included in an epoxy composition of this invention to modify the viscosity of an epoxy resin therein, the solvent or epoxide containing liquid or mixture is generally present in an amount in the range of from about 20% to about 40% by weight of the epoxy composition, preferably in an amount of about 27%. An epoxide containing liquid or a mixture of such liquids can also be utilized as the only epoxide source in an epoxy composition of this invention.

While various epoxide containing liquids can be used, preferred such liquids are the diglycidyl ether of 1,4-butanediol, the diglycidyl ether of neopentyl glycol and the diglycidol ether of cyclohexanedimethanol. A suitable epoxide containing liquid comprised of the diglycidyl ether of 1,4-butanediol is commercially available from the Shell Chemical Company under the trade name "HELOXY®67". This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentylglycol is commercially available from Shell Chemical Company under the trade name "HELOXY®68". This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexanedimethanol is commercially available from Shell Chemical Company under the trade name "HELOXY®107". This epoxide containing liquid has a viscosity at 25° C. in the range of from about 55 to about 75 centipoises, a molecular weight of 256 and a one gram equivalent of epoxide per about 155 to about 165 grams of the liquid.

When an epoxide containing liquid or mixture is utilized as the only epoxide source in an epoxy composition of this invention, the epoxide containing liquid or mixture is generally present in an amount in the range of from about 20% to about 80% by weight of the epoxy composition, preferably in an amount of about 50%.

The organosilane compound functions in the epoxy compositions of this invention to impart high metal pipe surface bond strengths to the compositions. The organosilane compound undergoes hydrolysis in the presence of trace quantities of water whereby trialkoxysilanols are formed which dehydrate and form strong bonds to pipe surfaces. That is, the dehydration results in the formation of bonds with iron oxide on the pipe.

Suitable organosilane compounds include 3-aminopropyltrimethyoxysilane, 3-aminopropyltriethoxysilane, N-2-(aminoethyl)-3-ammopropyltriethoxysilane and 3-glycidoxy-propyltrimethoxysilane. Of these, 3-glycidoxypropyltrimethoxysilane is preferred. The organosilane compound is included in an epoxy composition of this invention in an amount in the range of from about 0.1% to about 5% by weight of the epoxy composition, preferably in an amount of about 0.5%.

A variety of hardening agents including, but not limited to, aliphatic amines, amide amines, amido amines, imidazoles, aliphatic tertiary amines, aromatic amines, cycloaliphatic amines, heterocyclic amines, polyamides, polyethylamines and carboxylic acid anhydrides can be utilized in the compositions of this invention containing the above described epoxy resins and/or epoxide containing liquids. Of these, aliphatic amines, aromatic amines and carboxylic acid anhydrides are the most suitable.

Examples of aliphatic and aromatic amine hardening agents are triethylenetetraamine, ethylenediamine, N-cocoalkyltrimethylenediamine, isophoronediamine, diethyltoluenediamine, and tris (dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltrimethylenediamine, isophoronediamine, diethyltoluenediamine and tris (dimethylaminomethylphenol) are preferred, with isophoronediamine, diethyletoluenediamine and tris (dimethylaminomethylphenol) being the most preferred. The hardening agent or agents utilized are included in the epoxy compositions of the present invention in an amount in the range of from about 20% to about 50% by weight of the compositions.

As mentioned above, the epoxy compositions can also include a particulate filler such as crystalline silicas, amorphous silicas, clays, calcium carbonate or barite. When such a filler is utilized, it is added to an epoxy composition of this invention in an amount in the range of from about 100% to about 300% by weight of the composition.

A preferred method of this invention for sealing a plug in a pipe disposed in a well bore comprises the following steps. A hardenable epoxy sealing composition of this invention is prepared which hardens into a resilient solid mass having high bond strength. The epoxy composition is basically comprised of an epoxy resin or an epoxide containing liquid, or both, of the types described above, an organosilane compound of the type described above and at least one hardening agent of the type described above. After the epoxy composition has been prepared, it is placed in a pipe disposed in a well bore adjacent to a plug therein and the epoxy composition is allowed to harden.

In order to further illustrate the methods and epoxy compositions of this invention, the following examples are given.

EXAMPLE 1

An epoxide containing liquid comprised of diglycidyl ether of cyclohexane dimethanol and an epoxy resin comprised of the condensation product of epichlorohydrin and bisphenol A mixed with an aromatic solvent were tested individually and in 50% mixtures with each other. The epoxides were mixed with an organosilane, i.e., N-2-(aminoethyl)-3-aminopropyltrimethoxysilane and a hardening agent comprised of 2-ethyl-4-methylimidazole or a mixture of diethyltoluenediamine and tris (dimethylaminoethylphenol). Microsand (powdered crystalline silica) was added to the mixtures, and the mixtures were tested for shear bond strength. Additional identical mixtures were prepared without the organosilane compound, and they were also tested for shear bond strength.

The apparatus used to determine the shear bond strength included a standard ASTM 2"×2"×2" cube mold with a plastic liner and a metal plate to which the epoxide mixtures tested bonded to. A plastic liner was used to prevent the epoxide mixtures from bonding to the sides and bottom of the mold. The metal plate was 2" wide×3" high×0.5" thick with smooth surfaced ends at the top and bottom of the 3" height. The surfaced bottom served as a means to obtain a vertical positioning of the metal plate in the mold during pouring and curing of the epoxy mixture and the surfaced top was used for applying even loading to the plate. The other surfaces of the plate were sand blasted. The plate was placed in the center of the plastic mold and the epoxide mixtures tested were poured on both sides of the plate.

Each epoxide mixture tested was cured in the mold for 72 hours at 140° F. Thereafter, the bonding plate with the cured epoxy mixture bonded thereto was placed in a support apparatus whereby the bottom and sides of the cured epoxy mixture were supported but the area immediately below the bonding plate was not. The support system was then placed between the loading platens of a load press, and a load was applied to the bottom of the support system and the top of the bonding plate. The load (in psi.) at which the bond between the plate surfaces and the epoxide mixture failed, i.e., the shear bond strength was noted.

The quantities of the various components of each epoxide mixture tested and the shear bond strengths determined are set forth in Table I below.

EXAMPLE 2

Additional epoxide mixtures of the type described above were prepared except that the hardening agent utilized was a mixture of diethyltoluenediamine and tris (dimethylaminoethylphenol). Also, two different organosilane compounds were utilized which were compared to each other and to identical epoxy mixtures without a silane compound. The results of these tests are set forth in Table II below.

TABLE I

SHEAR BOND STRENGTH TESTS

Quantities of Components, % by weight of Epoxide Liquid, Epoxy Resin or mixtures thereof.

| Sample No. | Epoxide[1] Liquid | Epoxy[2] Resin Diluted with Aromatic Solvent | First[3] Hardening Agent | Second[4] Hardening Agent | Third[5] Hardening Agent | Micro[6] Sand | Organo[7]- Silane Compound | Shear Bond Strength, psi |
|---|---|---|---|---|---|---|---|---|
| 1 | None | 100 | 3 | None | None | 150 | 0.05 | 185 |
| 2 | 50 | 50 | 3 | None | None | 150 | 0.05 | 460 |
| 3 | 100 | None | None | 28 | 0.3 | 150 | 0.475 | 3020 |
| 4 | None | 100 | 3 | None | None | 150 | None | 81 |
| 5 | 50 | 50 | 3 | None | None | 150 | None | 171 |
| 6 | 100 | None | None | 28 | 0.3 | 150 | None | 258 |

[1]Diglycidyl ether of cyclohexane dimethanol - "HELOXY ®107" from Shell Chemical Co.
[2]Epichlorohydrin and bisphenol A resin ("EPON ®RESIN 828") diluted with aromalic solvent - "EPSEAL ®RE" from Shell Chemical Co.
[3]2-ethyl-4-methyl imidazole
[4]Diethyltoluenediamine
[5]Tris(dimethylaminoethylphenol)
[6]Powdered crystalline silica
[7]N-2-(aminoethyl)-3-aminopropyltrimethoxysilane From Table I it can be seen that the presence of the organosilane compound in the epoxide mixtures substantially increased the shear bond strengths of the mixtures.

TABLE II

COMPRESSIVE STRENGTH AND SHEAR BOND STRENGTH TESTS

Quantities of Components, % by Weight of Epoxide Liquid, Epoxy Resin or Mixture Thereof.

| Sample No. | Epoxide[1] Liquid | Epoxy[2] Resin Diluted With Aromatic Solvent | First[3] Hardening Agent | Second[4] Hardening Agent | Micro[5] Sand | First[6] Organo-Silane Compound | Second[7] Organo-Silane Compound | Compressive Strength, psi | Shear Bond Strength, psi |
|---|---|---|---|---|---|---|---|---|---|
| 1 | 100 | None | 28 | 2.5 | 150 | 0.5 | None | 20,900 | 1294 |
| 2 | 80 | 20 | 28 | 2.5 | 150 | 0.5 | None | 18,780 | 628 |
| 3 | 60 | 40 | 28 | 2.5 | 150 | 0.5 | None | 14,410 | 288 |
| 4 | 100 | None | 28 | 2.5 | 150 | 1 | None | 22,900 | 1315 |
| 5 | 80 | 20 | 28 | 2.5 | 150 | 1 | None | 21,900 | 583 |
| 6 | 60 | 40 | 28 | 2.5 | 150 | 1 | None | 17,280 | 476 |
| 7 | 100 | None | 2S | 2.5 | 150 | None | 0.5 | 22,400 | 963 |
| 8 | 80 | 20 | 28 | 2.5 | 150 | None | 0.5 | 20,100 | 538 |
| 9 | 60 | 40 | 28 | 2.5 | 150 | None | 0.5 | 15,770 | 362 |
| 10 | 100 | None | 28 | 2.5 | 150 | None | None | 17,620 | 759 |
| 11 | 80 | 20 | 28 | 2.5 | 150 | None | None | 16,940 | 566 |
| 12 | 60 | 40 | 28 | 2.5 | 150 | None | None | 14,450 | 408 |

[1]Diglycidyl ether of cyclohexane dimethanol - "HELOXY ®107" from Shell Chemical Co.
[2]Epichlorohydrin and bisphenol A resin ("EPON ®RESIN 828") diluted with aromatic solvent - "EPSEAL ®RE" from Shell Chemical Co.
[3]Diethyltoluenediamine.
[4]Tris(dimethylaminoethylphenol).
[5]Powdered crystalline silica.
[6]3-glycidoxypropyltrimethoxysilane.
[7]3-aminopropyltrimethoxysilane.

From Table II it can be seen that the presence of an organosilane compound in the epoxide mixtures substantially increased both the compressive strengths and shear bond strengths of the hardened mixtures.

Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. An improved method of sealing a bridge plug in a pipe disposed in a well bore comprising the steps of:
   (a) preparing a hardenable epoxy sealing composition which hardens into a resilient solid mass having high bond strength comprising an epoxide containing liquid, an organosilane compound and a hardening agent;
   (b) placing said epoxy composition in said pipe adjacent to said bridge plug; and
   (c) allowing said epoxy composition to harden.

2. The method of claim 1 wherein said epoxide containing liquid is selected from the group of the diglycidyl ether of neopentyl glycol, the diglycidyl ether of cyclohexanedimethanol and mixtures of such liquids and is present in said composition in an amount in the range of from about 20% to about 80% by weight thereof.

3. The method of claim 1 wherein said organosilane compound is selected from the group of 3-aminopropyltrimethoxysilane, 3-aminopropyltriethoxysilane, N-2-(aminoethyl)-3-aminopropyltriethoxysilane and 3-glycidoxypropyltrimethoxysilane and is present in said composition in an amount in the range of from about 0.1% to about 5% by weight thereof.

4. The method of claim 1 wherein said hardening agent is at least one member selected from the group of aliphatic amines, aromatic amines, amide amines, amido amines, imidazoles and carboxylic acid anhydrides and is present in said composition in an amount in the range of from about 20% to about 50% by weight thereof.

5. The method of claim 1 wherein said hardening agent is at least one member selected from the group of triethylenetetraamine, ethylenediamine, N-cocoalykyltrimethylenediamine, isophoronediamine, diethyltoluenediamine and tris (dimethylaminomethylphenol) and is present in said composition in an amount in the range of from about 20% to about 50% by weight thereof.

6. The method of claim 1 wherein said epoxy composition is dispersed in water.

7. The method of claim 1 wherein said epoxy composition further comprises water and an epoxy resin selected from the group of the condensation products of epichlorohydrin and bisphenol A and epoxidized bisphenol A novalac resin.

8. The method of claim 1 wherein said epoxy composition further comprises a particulate filler.

9. The method of claim 8 wherein said particulate filler is selected from the group consisting of crystalline silicas, amorphous silicas, clays, calcium carbonate and barite and is added to said composition in an amount in the range of from about 100% to about 300% by weight thereof.

10. An improved method of sealing a bridge plug in a pipe disposed in a well bore comprising the steps of:
    (a) preparing a hardenable epoxy sealing composition which hardens into a resilient solid mass having high bond strength comprising an epoxy resin, an organosilane compound and a hardening agent;
    (b) placing said epoxy composition in said pipe adjacent to said bridge plug; and
    (c) allowing said epoxy composition to harden.

11. The method of claim 10 wherein said epoxy resin is selected from the group of the condensation products of epichlorohydrin and bisphenol A and epoxidized bisphenol A novalac resin, and is present in said composition in an amount in the range of from about 20% to about 50% by weight thereof.

12. The method of claim 10 wherein said organosilane compound is selected from the group of 3-aminopropyltrimethoxysilane, 3-aminopropyltriethoxysilane, N-2-(aminoethyl)-3-aminopropyltriethoxysilane and 3-glycidoxypropyltrimethoxysilane and is present in said composition in an amount in the range of from about 0.1% to about 5% by weight thereof.

13. The method of claim 10 wherein said hardening agent is at least one member selected from the group of aliphatic amines, aromatic amines, amide amines, amido amines, imidazoles and carboxylic acid anhydrides and is present in said composition in an amount in the range of from about 20% to about 50% by weight thereof.

14. The method of claim 10 wherein said hardening agent is at least one member selected from the group of triethylenetetraamine, ethylenediamine, N-cocoalykyltrimethylenediamine, isophoronediamine, diethyltoluenediamine and tris (dimethylaminomethylphenol) and is present in said composition in an amount in the range of from about 20% to about 50% by weight thereof.

15. The method of claim 10 wherein said epoxy composition further comprises an epoxide containing liquid selected from the group of the diglycidyl ether of 1,4-butanediol, the diglycidyl ether of neopentyl glycol and the diglycidyl ether of cyclohexanedimethanol and mixtures of such liquids and is present in said composition in an amount in the range of from about 20% to about 80% by weight thereof.

16. The method of claim 15 wherein said epoxy composition is dispersed in water.

17. The method of claim 10 wherein said epoxy composition is dispersed in water.

18. The method of claim 10 wherein said epoxy resin is selected from the group of the condensation products of epichlorohydrin and bisphenol A and is diluted with a liquid diluent comprising one or more aromatic hydrocarbons.

19. The method of claim 10 wherein said composition further comprises a particulate filler.

20. The method of claim 19 wherein said filler is selected from the group consisting of crystalline silicas, amorphous silicas, clays, calcium carbonate and barite and is added to said composition in an amount in the range of from about 100% to about 300%$ by weight thereof.

* * * * *